(12) United States Patent
Closi, Jr. et al.

(10) Patent No.: US 9,469,550 B2
(45) Date of Patent: Oct. 18, 2016

(54) UNIVERSAL FILTER SYSTEM FOR FLUID CONTAINERS

(76) Inventors: Peter J. Closi, Jr., Orlando, FL (US); Linda M. Closi, Jr., West Palm Beach, FL (US)

( * ) Notice: Subject to any disclaimer, the term of this patent is extended or adjusted under 35 U.S.C. 154(b) by 481 days.

(21) Appl. No.: 13/441,847

(22) Filed: Apr. 7, 2012

(65) Prior Publication Data

US 2013/0264262 A1 Oct. 10, 2013

(51) Int. Cl.
*B01D 35/02* (2006.01)
*C02F 1/28* (2006.01)
*C02F 1/00* (2006.01)
*C02F 1/68* (2006.01)

(52) U.S. Cl.
CPC ............... *C02F 1/002* (2013.01); *C02F 1/283* (2013.01); *C02F 1/688* (2013.01); *C02F 2201/004* (2013.01); *C02F 2307/02* (2013.01)

(58) Field of Classification Search
CPC ........ C02F 1/002; C02F 1/283; C02F 1/685; C02F 1/687; C02F 1/688; C02F 2201/004; C02F 2201/006; C02F 2307/02; C02F 2307/04; B01D 35/04; B01D 35/046; B01D 35/306
USPC ........ 210/244, 463, 466; 215/288, 355, 364, 215/386
See application file for complete search history.

(56) References Cited

U.S. PATENT DOCUMENTS

| 4,555,341 A * | 11/1985 | Nugent ........................ 210/359 |
| 5,417,860 A * | 5/1995 | Kay .............................. 210/472 |
| 5,609,759 A | 3/1997 | Nohren, Jr. et al. |
| 5,681,463 A | 10/1997 | Shimizu et al. |
| 5,914,045 A | 6/1999 | Palmer et al. |
| 5,944,208 A * | 8/1999 | Gale ............................. 215/296 |
| 6,136,189 A * | 10/2000 | Smith et al. .................. 210/266 |
| 6,165,362 A | 12/2000 | Nohren, Jr. et al. |
| 6,193,886 B1 * | 2/2001 | Nohren, Jr. .................. 210/282 |
| 6,200,471 B1 | 3/2001 | Nohren, Jr. |
| 6,569,329 B1 | 5/2003 | Nohren, Jr. |
| D631,286 S | 1/2011 | Smiedt et al. |
| 2011/0108511 A1 * | 5/2011 | McKinney .................... 215/355 |

FOREIGN PATENT DOCUMENTS

WO   WO 00/68151   * 11/2000   ............... C02F 1/00

* cited by examiner

*Primary Examiner* — Matthew O Savage
(74) *Attorney, Agent, or Firm* — Young Basile Hanon & MacFarlane PC

(57) ABSTRACT

A universal filter system is provided for filtering a fluid in a fluid container, such as water in a water bottle. The system can be selectively attached to and removed from a plurality of fluid containers. For instance, the filter system can be applied to a first fluid container. After use, the filter system can be removed from the first fluid container. The filter system can then be used in connection with the first fluid container again or with a different fluid container. The filter system can include a filter and one or more container-engaging elements that are configured to sealingly engage a portion of a plurality of fluid containers, including interior and/or exterior portions of such fluid containers. In this way, the leakage of a fluid from the container can be prevented and the fluid must pass through the filter before exiting the outlet of the fluid container.

16 Claims, 4 Drawing Sheets

UNIVERSAL FILTER SYSTEM FOR FLUID CONTAINERS

FIELD

Embodiments relate in general to the dispensing of fluids from a container and, more particularly, to systems and methods for filtering fluids dispensed from a container.

BACKGROUND

It is well known that staying hydrated is important. The human body depends on water for survival. Water has many significant functions. For instance, it regulates body temperature, lubricates joints as well as transports nutrients and waste throughout the body. Bottled water is widely available in modern society, but an individual consumer typically has no way of knowing the quality of the water contained in such bottles. Consequently, the individual has no choice but to consume the water from the bottle as is. However, there is no guarantee that any impurities, contaminants and/or unwanted chemicals in the water are within safe levels.

At least one company presently makes a water bottle with an integrated filter. The filter is configured for use with only the bottle that it is provided with. The filter cannot be reused with other bottles. Thus, unless the user refills that particular bottle, the user may not be consuming filtered water. Moreover, a user may dispose of the filter with the bottle, thereby increasing waste.

Thus, there is a need for systems and methods that can minimize such concerns.

SUMMARY

In one respect, embodiments are directed to a universal filter device. The device can be attached to a plurality of different fluid containers. The device includes a filter casing. The filter casing has an elongated body with an at least partially open first end and a closed second end. The filter casing is hollow and has an inner chamber. The filter casing can include a plurality of openings formed therein. Such openings permit fluid communication between the inner chamber and outside the body of the filter casing.

The device includes a filter. The filter is received in the inner chamber of the filter casing. The filter can include activated carbon and/or activated coconut carbon.

The device includes one or more container-engaging elements operatively connected to the filter casing. The one or more container-engaging elements are configured to substantially sealingly engage a portion of a plurality of different fluid containers. Thus, the leakage of water or other fluid in such fluid containers can be prevented.

In one embodiment, the one or more container-engaging elements can be provided on an outer surface of the filter casing. In another embodiment, the one or more container-engaging elements can be provided on a separate adapter, which can be operatively connected to an outer peripheral surface of the filter casing.

The one or more container-engaging elements can have any suitable form. The one or more container-engaging elements can be configured to substantially sealingly engage an interior portion of an outlet of one or more different fluid containers. Alternatively, the one or more container-engaging elements can be configured to substantially sealingly engage an exterior portion of one or more different fluid containers. In one embodiment, the one or more container-engaging element can include a plurality of ribs. The plurality of ribs can have different outer diameters. In such case, the plurality of ribs can be arranged such that the outer diameter of each rib decreases along the length of the filter casing.

The device can further include a treatment element, which can be disposed within the filter casing. The treatment element can be one or more vitamins, minerals, medicines and/or flavorings.

In another respect, embodiments are directed to a universal filter device. The device includes a filter casing. The filter casing has an elongated body with an at least partially open first end and a closed second end. The filter casing is hollow and has an inner chamber. The filter casing can include a plurality of openings formed in the body. Such openings can permit fluid communication between the inner chamber and outside the body.

A filter is received in the inner chamber of the filter casing. The filter can be any suitable type of filter. In one embodiment, the filter can include activated carbon and/or activated coconut carbon.

The device further includes a cover. The cover is adapted to fit over at least a portion of an outlet of a fluid container. The first end of the filter casing is operatively connected to the cover.

The device also includes one or more container-engaging elements. The container-engaging elements are operatively connected to the cover. The one or more container-engaging elements are configured to substantially sealingly engage a portion of a plurality of different fluid containers. In this way, the device can be used on different bottles while preventing the leakage of water or other fluid from the container.

The device may further include a treatment element. The treatment element can be disposed within the filter casing. The treatment element can be one or more vitamins, minerals, medicines and/or flavorings.

In one embodiment, the one or more container-engaging elements can substantially sealingly engage an inner surface of the cover. Alternatively or in addition, the one or more container-engaging elements can be configured to substantially sealingly engage an exterior portion of one or more fluid containers. In one embodiment, the one or more container-engaging element can be a flexible washer.

In still another respect, embodiments are directed to a universal filter system for fluid containers. The system includes a fluid container that has an interior and an exterior. The fluid container has a fluid outlet opening. The system also includes a universal filter system that is removably and substantially sealingly attached to the fluid container.

The universal filter system includes a filter casing with an elongated body. The filter casing has a first end that is at least partially open and a second end that is closed. The filter casing is hollow and has an inner chamber. A plurality of openings is provided in the filter casing body to permit fluid communication between the inner chamber and outside the body. A filter is received in the inner chamber of the filter casing.

The universal filter system also includes a cover adapted to enclose at least a portion of the fluid outlet opening of the fluid container. The first end of the filter casing is operatively connected to the cover.

The system further includes one or more container-engaging elements. These elements are operatively connected to universal filter system. The one or more container-engaging elements are configured to substantially sealingly engage a portion of the fluid container and at least one other fluid container. In this way, leakage of a fluid from the fluid containers can be prevented.

The one or more container-engaging elements can be configured to substantially sealingly engage an interior portion of the fluid outlet opening of the fluid container. For instance, in one embodiment, the one or more container-engaging element can be a plurality of ribs, which can be operatively connected to the filter casing.

Alternatively or in addition, the one or more container-engaging elements can be configured to substantially sealingly engage an exterior portion of the fluid container. In such case, the one or more container-engaging elements can be a flexible washer.

DETAILED DESCRIPTION

Figure 1:
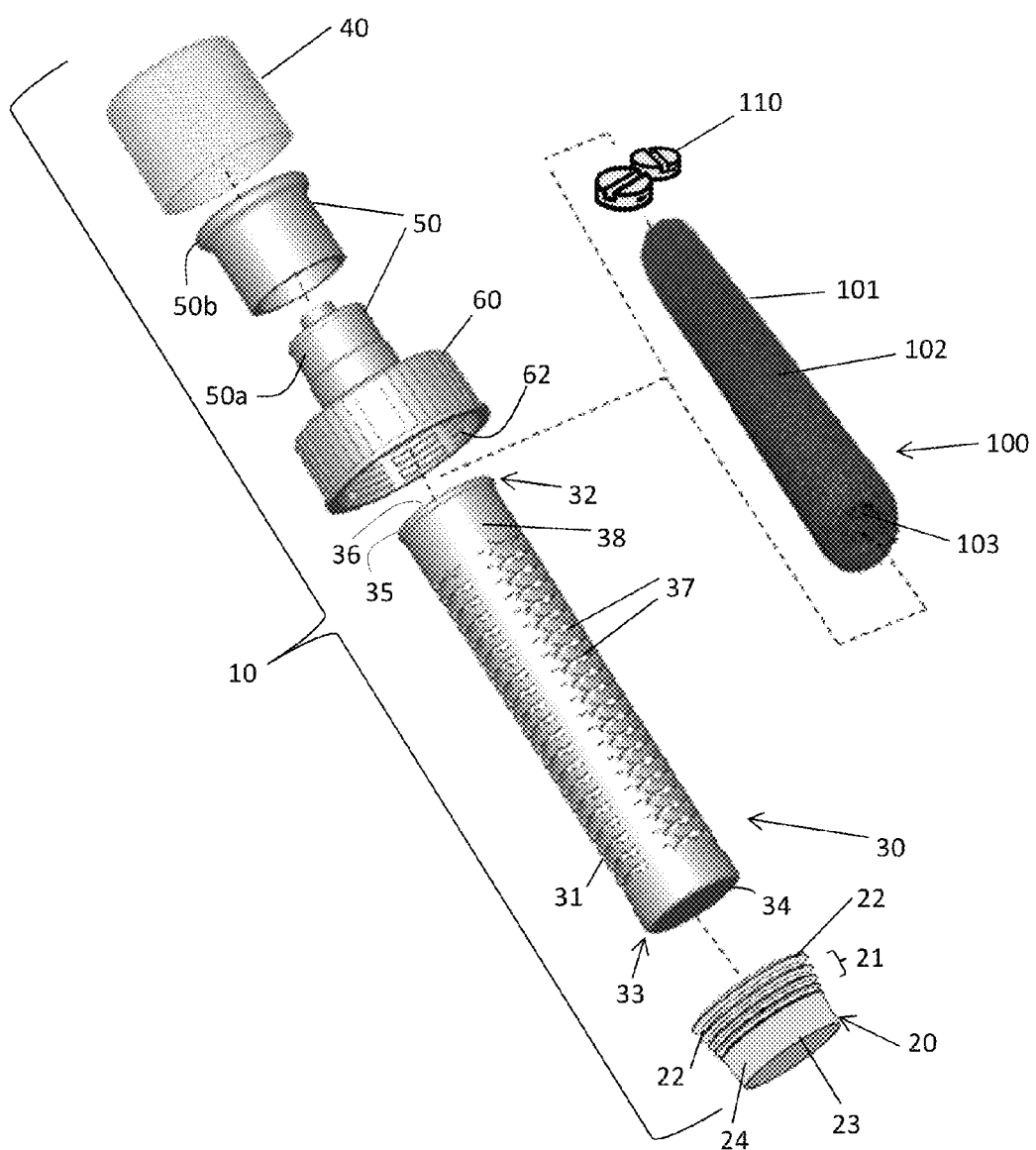
FIG. 1 is an exploded view of an example of a universal filter system.

Arrangements described herein relate to systems for allowing a universal filter system that can be used on a plurality of fluid containers and associated methods. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, one example of a universal filter system 10 for a fluid container is shown. The universal filter system 10 can include a filter casing 30, a filter 100 and one or more container-engaging elements 21. In some instances, the universal filter system 10 can also include an adapter 20, a cover 60, a flow control top 50 and/or a cap 40. Each of these components of the universal filter system 10 will be discussed in turn below.

The filter casing 30 can have a body 31, a first end 32 and a second end 33. In one embodiment, the first end 32 of the filter casing 30 can be at least partially open, and the second end 33 of the filter casing 30 can be closed. The closed second end 33 of the filter casing 30 can be achieved in any suitable manner. For instance, the body 31 of the filter casing 30 can be configured so that an end wall 34 is formed at the second end 33. Alternatively, the body 31 of the filter casing 30 can be open at the second end 33, but the opening can be closed by any suitable separate closure element (not shown).

The first end 32 of the filter casing 30 can include a flange 35. The flange 35 can extend outwardly from the first end 32 of the filter casing 30. As will be described in more detail below, the flange 35 can be used as a stop for the adapter 20 when mounted on the filter casing 30 and/or to engage with a portion of the fluid container and/or the cover 60, such as a recess 61 (FIG. 3) provided in the cover 60, to which the universal filter system 10 is applied.

The body 31 of the filter casing 30 can be hollow having an inner chamber 36 within which the filter 100 can be received. The body 31 can be elongated. The body 31 can have any suitable cross-sectional shape. For instance, the body 31 can have a cross-sectional shape that is generally circular, rectangular, oval, polygonal, triangular, or trapezoidal, just to name a few possibilities. The cross-sectional shape of the body 31 can be substantially constant along the length of the filter casing 30. In some embodiments, the cross-sectional shape of the body 31 can vary in one or more places along the length of the filter casing 30.

The filter casing 30 can have any suitable cross-sectional size. The filter casing 30 can be sized appropriately depending on the application and/or the characteristics of the filter 100. In one embodiment, the cross-sectional size of the filter casing 30 can be substantially constant along the length of the filter casing 30. However, in some instances, the cross-sectional size of the filter casing 30 can vary along at least a portion of the length of the filter casing 30.

Figure 2:
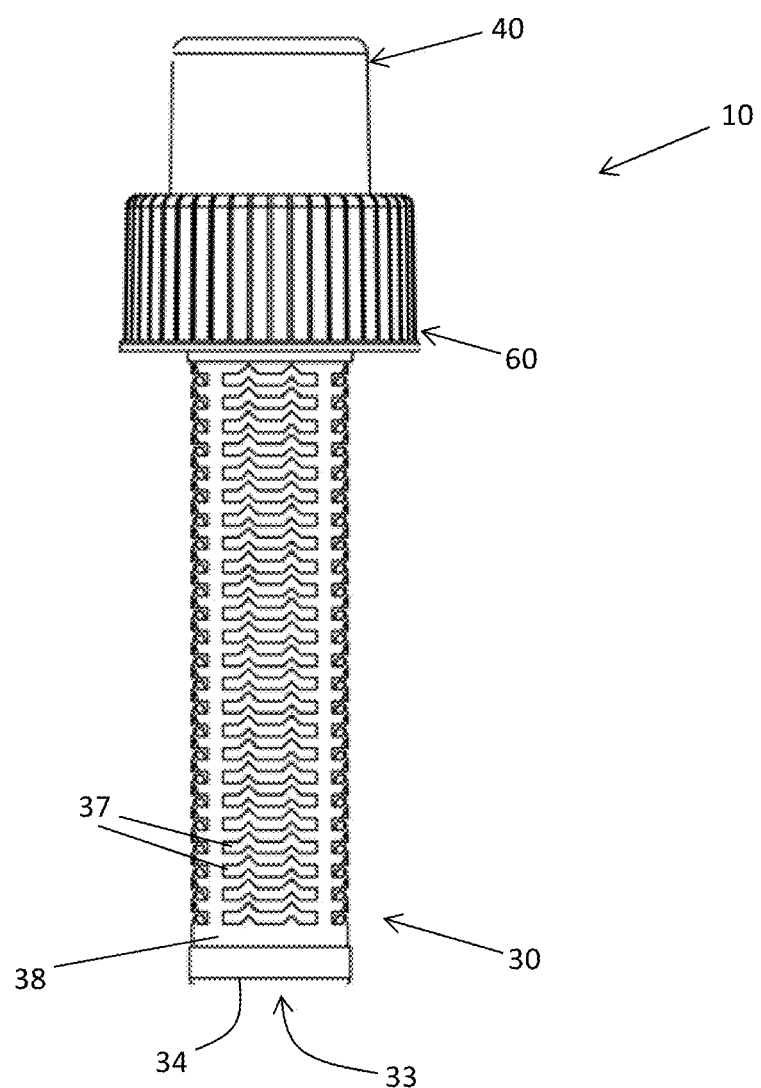
FIG. 2 is a side elevation view of an example of a universal filter system.

The filter casing 30 can be porous. To that end, the body 31 can include a plurality of openings 37 therein, as is shown in FIGS. 1 and 2. For instance, the openings 37 can be provided in a side wall 38 of the body 31. The openings 37 can have any suitable size and/or shape. The openings 37 can be generally circular, rectangular, oval, polygonal, triangular, trapezoidal, slotted, and combinations thereof. The openings 37 can be substantially identical to each other, or at least one of the openings 37 can be different from the other openings 37 in one or more respects. The openings 37 can be distributed on the body 31 in any suitable manner. In one embodiment, the openings 37 can be substantially equally spaced about the body 31 in one or more directions.

The filter casing 30 can be made of any suitable material. For instance, the filter casing 30 can be made at least partially of plastic, including, for example, Polylactic acid (PLA), Polyethylene terephthalate (PET), or high density polyethylene (HDPE). Alternatively or in addition, the filter casing 30 can be made at least partially of metal, such as aluminum.

The filter 100 can be received within the inner chamber of the filter casing 30. The filter 100 can reside within the filter casing 30 unattached. However, in some instances, the filter 100 can be attached to or otherwise be retained in the filter casing 30 in any suitable manner, including, for example, by fasteners, adhesives and/or mechanical engagement.

The filter 100 can have a body 101. The body 101 can have any suitable configuration. For instance, the body 101 can be hollow. In such case, the filter 100 can have an inner chamber 103. Alternatively, the body 101 can be substantially solid, that is, substantially free of large internal cavities or chambers.

The body 101 can be elongated and can include at least one side wall 102. The body 101 can have any suitable cross-sectional shape. For instance, the body 101 can have a cross-sectional that is generally circular, rectangular, oval, polygonal, triangular, or trapezoidal, just to name a few possibilities. The cross-sectional shape of the body 101 can be substantially constant along the length of the filter 100. In some embodiments, the cross-sectional shape of the body 101 can vary in one or more places along the length of the filter 100.

The filter 100 can have any suitable cross-sectional size. The filter 100 can be sized appropriately depending on the application at hand and/or the characteristics of the filter casing 30. In one embodiment, the cross-sectional size of the filter 100 can be substantially constant along its length. However, in some instances, the cross-sectional size of the filter 100 can vary along at least a portion of its length. At least a portion of the filter 100 can be substantially liquid-porous (e.g., water porous), at least along its one or more side wall 38.

The filter 100 can be any suitable type of filtering media. In one embodiment, the filter 100 can include activated carbon. More particularly, the filter 100 can include activated carbon with a plastic binder. In one embodiment, the filter 100 can include activated carbon and/or activated coconut carbon. The filter 100 can be capable of reducing levels of one or more undesired items from a potable liquid. For example, the filter 100 can be capable to reduce the level of lead, chlorine, and/or other compounds and organics, organisms within the potable liquid, which can be, for example, drinking water.

The longer the length and/or width of the filter casing 30, the thinner the walls of a hollow filter 100 can be while maintaining the same surface area of the filter 100. As a result, such a relationship can allow for the same amount of quality filtering, with less force (e.g., suction) required to draw the fluid content out of a fluid container. Naturally, the length and width of the filter casing 30 and/or the filter 100 may be constrained by the dimensions of the fluid containers to which they are applied. In one embodiment, the length of the filter casing and/or the filter 100 can be from about 30 millimeters to about 200 millimeters. More particularly, the length of the filter casing and/or the filter 100 can be about 100 millimeters or less. In one embodiment, the width of the filter casing 30 and/or the filter 100 can be from about 10 millimeters to about 50 millimeters. More particularly, the width of the filter casing 30 and/or the filter 100 can be from about 10 millimeters to about 21 millimeters.

In addition to the filter 100, a fluid treatment element 110 can be associated with the filter 100 or otherwise provided within the inner chamber 36 in any suitable manner. For instance, when the filter 100 is hollow, a fluid treatment element 110 can be placed in the inner chamber 103 of the filter 100. Alternatively or in addition, at least a portion of the filter 100 can be impregnated with and/or coated with and/or otherwise in contact with the treatment element 110. The treatment element 110 can be any suitable substance, including, for example, one or more vitamins, minerals, medicines and/or flavorings, just to name a few possibilities. The treatment element 110 can be provided in any suitable form, such as tablets, granules, capsules, pellets, pills, syrup, liquid, or gaseous form. Alternatively or in addition, the treatment element 110 can be an ultraviolet light source. In some instances, the treatment element 110 can be used to kill bacteria, viruses, and protozoa.

As noted above, the filter system 10 can include one or more container-engaging elements 21, such as ribs 22. In one embodiment, the adapter 20 can comprise a plurality of ribs 22. The container-engaging elements 21 can operatively engage a portion of a fluid container 80, such as the outlet opening 84 thereof, to provide a seal therebetween. Such a seal can prevent the passage or leakage of water or other fluid within the container through this interface.

Figure 3:
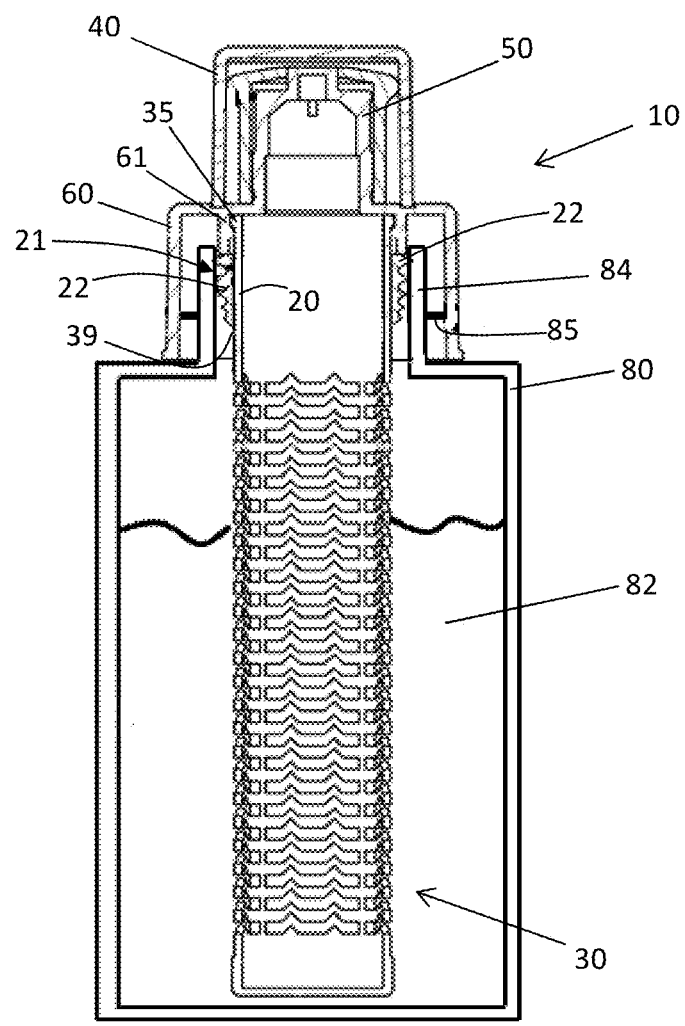
FIG. 3 is a side elevation cross-sectional view of an example of a universal filter system in combination with a fluid container.

The container-engaging elements 21 can be made of any suitable material. The container-engaging elements can be made of a pliant, flexible and/or elastic material. The one or more container-engaging elements 21 can be made of rubber, plastic, or other pliant, flexible and/or elastic material. The container-engaging elements 21 can extend outwardly away from the filter casing 30. When a plurality of container-engaging elements 21 is provided, the container-engaging elements can be substantially identical to each other. Alternatively, one or more of the container-engaging elements 21 can be different from the other container-engaging elements in one or more respects. As an example, the container-engaging elements (e.g., ribs) shown in FIGS. 1 and 3 are of varying outer diameters. In one embodiment, as is shown in FIG. 3, the outer diameter of each container-engaging element can decrease along the length of system, moving from the first end to the second end of the filter casing 30.

The container-engaging elements 21 can extend at substantially 90 degrees relative to the body 31 of the filter casing 30. In some instances, at least one of the container-engaging elements 21 can extend at greater than or less than 90 degrees relative to the side wall 38 of the filter casing 30 and/or the adapter 20. In such case, one or more of the container-engaging elements 21 can extend toward the first end 32 of the filter casing 30. Alternatively or in addition, one or more of the container-engaging elements 21 can extend toward the second end 33 of the filter casing 30.

When a plurality of container-engaging elements 21 is provided, the container-engaging elements 21 can be distributed in any suitable manner. For instance, the container-engaging elements 21 can be equally spaced from each other. In some instances, the container-engaging elements 21 may be non-equally spaced in at least some areas. In still other embodiments, there may be no spacing between at least some of the container-engaging elements 21.

The one or more container-engaging elements 21 can be operatively connected to the filter casing 30. The term "operatively connected," as used herein, can include direct or indirect connections, including connections without direct physical contact. In one embodiment, the container-engaging elements 21 can directly contact the filter casing 30, such as on outer peripheral surface 39, as is shown in FIG. 3, or an inner surface thereof (not shown). In such case, the container-engaging elements 21 can be formed together with the filter casing 30. Alternatively, the container-engaging elements 21 can be formed separately and attached to the filter casing in any suitable manner, such as by mechanical engagement, fasteners, welding, bonding, and/or adhesives, just to name a few possibilities.

In another embodiment, as is shown in FIG. 1, the container-engaging elements 21 can be provided on a separate element. To that end, the system 10 can include an adapter 20. The adapter 20 can be configured to engage a portion of a fluid container, such as a drinking bottle. The adapter 20 can have any suitable form. The adapter 20 can have an adapter body 23 on which the container-engaging elements 21 are provided. The body 23 can be hollow. The adapter 23 can include an outer peripheral surface 24. The outer peripheral surface 24 can have any suitable shape, including generally circular. According to embodiments herein, the container-engaging elements 21 can be provided on the outer peripheral surface 24.

The adapter 20 can engage the filter casing 30 in any suitable manner. For instance, the adapter 20 can fit over the upper end of the filter casing 30. As an example, the adapter 20 can be placed on the body 31 of the filter casing 30 at the second end 33 thereof. The adapter 20 can be slid along the length of the filter casing 30 toward the first end 32 of the filter casing 30. Movement of the adapter 20 along the length of the filter casing 30 can be restrained by flange 35. The adapter 20 can be attached the filter casing 30 in any suitable manner, including by welding, bonding, adhesives, fasteners and/or mechanical engagement (e.g., force fit), just to name a few possibilities.

Referring to FIG. 3, the container-engaging elements 21 can be sized, shaped and/or otherwise configured to engage fluid containers 80 with outlet openings 84 of various sizes. In one embodiment, the container-engaging elements 21 can be configured to engage an interior portion of a fluid container. For instance, the container-engaging elements 21 can be configured to engage fluid containers 80 with outlet openings 84 having an inner diameter from about 10 millimeters to about 50 millimeters, and, more particularly, from about 15 millimeters to about 30 millimeters. Of course, the container-engaging elements 21 can be configured to engage outlet openings 84 having inner diameters greater than and/or less than this size range. For instance, the container-engaging elements 21 can be configured to engage drink bottles having a wide-mouth It should be noted that the container-engaging elements 21 are not limited to engaging an interior portion (e.g., the inner diameter of the outlet opening 84) of the fluid container 80. Indeed, the container-engaging elements 21 can be configured to engage an exterior portion of the fluid container 80, such as an outer surface (e.g. the outer diameter) of the fluid container 80. For instance, the container-engagement element 21 can be configured to engage an exterior portion of the outlet opening 84 of the fluid container. In one embodiment, the container-engaging elements 21 can include one or more flexible washers 85 (FIG. 3), such as a plastic washer or a rubber washer. Of course, combinations of the above-described and other container-engaging elements 21 can be provided. In such case, the container-engaging elements 21 can be attach to or otherwise engage a portion of the cover 60, as is shown in FIG. 3

In some instances, the filter system 10 can include a cover 60 for covering at least a portion of a fluid container 80. The cover 60 can have any general configuration. In one embodiment, the cover 60 can be adapted to fit over at least a portion of the fluid container 80, such as the outlet opening 84, as is shown in FIG. 3. In some instances, the cover 60 can include one or more features, such as internal threads 62 (FIG. 1), adapted to engage a portion of the fluid container, such as external threads (not shown) provided on the outlet opening 84 of the fluid container 80. Still further, one or more container-engaging elements 21 can be provided on the cover 60, such as flexible washer 85 (FIG. 3). In other instances, the cover 60 may not include any features for engaging a portion of the fluid container 80. The cover 60 can provide a more aesthetic external appearance to the fluid container 80 with the filter system 10 operatively attached thereto.

It should be noted that the filter casing 30 can engage a portion of the cover 60. For instance, the flange 35 of the filter casing 30 can engage with the interior of the cover 60, such as a recess 61 provided therein. Alternatively or in addition, at least a portion of the filter casing 30 can engage an exterior portion of the cover 60. Still alternatively or in addition, at least a portion of the filter casing 30 can engage a portion of the fluid container 80.

The filter system 10 can also include a flow control top 50. The flow control top 50 can be configured in any suitable manner to selectively permit the flow of a fluid 82 out of and/or into the container 80. The flow control top 50 can be a reciprocating valve, sports bottle, baby bottle nipple, or a spray device, just to name a few possibilities. In some instances, at least a portion of the flow control top 50 can be formed with the cover 60. As an example, FIG. 1 shows the flow control top 50 including two pieces 50a, 50b. A first piece 50a is formed with the cover 60, and the second piece 50b is retained on the first piece 50a such that the second piece 50b can be selectively slid thereon to permit or prevent the flow of a fluid 82 out of the container 80. The flow control top 50 can be made of plastic or other suitable material.

The filter system 10 can further include a top cap 40. The top cap 40 can be removably connected to the cover 60 in any suitable manner, such as by snap fit, threads, or other mechanical engagement. The top cap 40 can be made of plastic or other suitable material.

Figure 4:
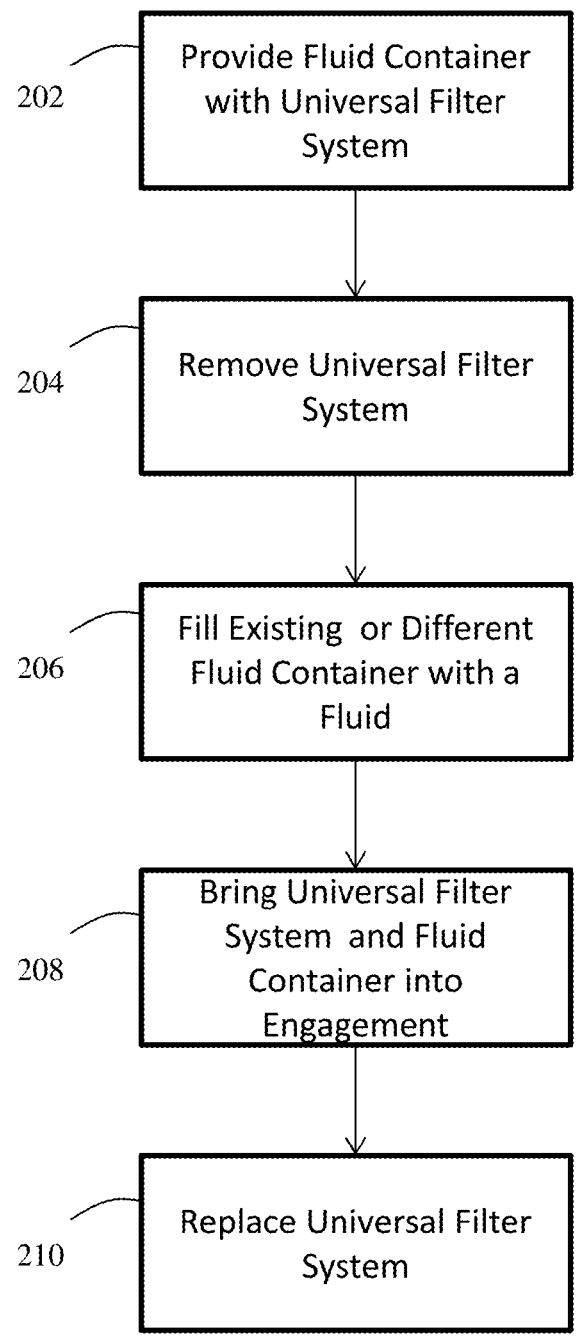
FIG. 4 is view of a method of using a universal filter system.

Now that the various possible components of the filter system 10 have been described, one manner of using the filter system 10 will now be presented. Referring to FIG. 4, a method 200 of using the filter system 10 is shown. Various possible steps of method 200 will now be described. The method 200 illustrated in FIG. 4 may be applicable to the embodiments described above, but it is understood that the method 200 can be carried out with other suitable systems and arrangements. Moreover, the method 200 may include other steps that are not shown here, and in fact, the method 200 is not limited to including every step shown in FIG. 4. The steps that are illustrated here as part of the method 200 are not limited to this particular chronological order, either. Indeed, some of the steps may be performed in a different order than what is shown and/or at least some of the steps shown can occur simultaneously.

At block 202, a fluid container 80 having a universal filter system 10, as described herein, can be provided. Such a container 80 may be assembled or packaged at a factory for subsequent purchase. Alternatively, such a container 80 can be assembled by a user or seller of the container or a fluid therein. It should be noted that the container 80 can be made of any suitable material, including, for example, metal, plastic or ceramic. The fluid can be any suitable fluid, including water or other potable liquid substance.

After the fluid 82 in the container 80 is consumed or no longer wanted, the user can at step 204 remove the universal filter system 10 from the container 80. Such removal may be achieved by applying a force to a portion of the universal filter system 10 and/or the container 80 to separate the two items from each other. In some instances, it may not be necessary to remove the filter system 10 from the container 80. The fluid container 80 can be rinsed, washed or discarded.

At step 206, the existing fluid container 80 or a different fluid container can be filled with a fluid. At step 208, the user can bring the filter system 10 and the fluid container 80 into engagement. The filter casing 30 can be inserted into the fluid container 80 through outlet opening 84. The relative movement between the filter system 10 and the fluid container 80 can continue with the second end 33 of the filter casing 30 moving away from the outlet opening 84 of the container 80. Such movement can continue until the elements 21 of the filter system 10 can substantially sealingly engage the fluid container 80. As will be appreciated, the elements 21 can be configured to sealingly engage outlet openings 84 of different sizes. Thus, the filter system 10 can be used in connection with different fluid containers 80.

Steps 204, 206 and/or 208 can be repeated as necessary as determined by the user. Eventually, the filter 100 will need to be replaced at step 210 after a period of use. In such case, the filter system 10 can be removed from the container 80. In one embodiment, the entire filter system 10 can be replaced to avoid the need for a user to touch or handle a filter 100, thereby minimizing contamination and exposure to potentially undesired substances. In another embodiment, the user may remove the filter 100 from the filter system 10 and replace the used filter 100 with a new filter.

Systems and methods described herein can provide numerous advantages and possible benefits. For instance, the filter system 10 is not limited to use in connection with only one particular drinking bottle. Indeed, embodiments herein allow for the use of the filter system 10 with a plurality of different bottles or fluid containers, thereby increasing the usability of the filter system 10 as well as maximizing the reusability of the filter system 10. Therefore, a user may be able to use the filter system in connection with any bottle he or she may own or purchase at a supermarket, vending machine, etc. By some estimates, the use of a filter system 10 herein can be used approximately 300 times, potentially preventing the same number of separate bottles and approximately 9 pounds of plastic from being used.

Further, by lengthening the filter casing 30 and decreasing the diameter thereof, an easier, smoother, and more controlled fluid flow from the fluid container 80 can be experienced compared to bottles with integrated filters currently available on the market. As noted above, by lengthening the length of the filter casing and/or widening the diameter of the filter casing, the walls of a hollow filter can be made thinner while the surface area of the filter remains the same. As a result, this allows for the same amount of quality filtering with less force (e.g., suction) need to extract the fluid from the fluid container.

Because the filter system can be reused, people can save money at venues with high-cost bottled water such as theme parks and sporting events by buying only one bottle of water and refilling it all day using the universal filter system. Still further, one or more of the components of the filter system can be made of a biodegradable material or a material that is environmentally friendly for other reasons.

It will be appreciated that, when the system includes a fluid treatment element (e.g., a ultraviolet light source or chemical additive), the system could potentially save lives or prevent sickness by delivering safe drinking water. Such an advantage may be particularly beneficial in third world countries.

Further, if the fluid treatment element includes flavoring(s) or the option to include flavoring(s), then the drinking water from the system can be made more appealing to younger users, who may tend to drink sodas and other high-sugar beverages.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed is:

1. A universal filter device comprising:
   a filter casing having an elongated body with an at least partially open first end and a closed second end, the filter casing being hollow and having an inner chamber, the filter casing including a plurality of openings therein to permit fluid communication between the inner chamber and outside the body, the filter casing having an inner peripheral surface and an outer peripheral surface;
   a filter received in the inner chamber of the filter casing; and
   an adapter separate from the filter casing, the adapter having a tubular adapter body with an inner peripheral surface and an outer peripheral surface, the adapter body being positioned on the filter casing such that the inner peripheral surface of the adapter body is operatively connected to the outer peripheral surface of the filter casing by at least frictional engagement at a location proximate to the at least partially open first end of the filter casing body,
   the adapter including one or more ribs, the one or more ribs being unitary with the adapter body and extending completely around the outer peripheral surface of the adapter body, the one or more ribs being configured to substantially sealingly engage a portion of a plurality of fluid containers, whereby leakage of water or other fluid from the fluid containers can be prevented.

2. The device of claim 1, wherein the filter includes at least one of activated carbon or activated coconut carbon.

3. The device of claim 1, further including a treatment element within the filter casing, wherein the treatment element is one or more vitamins, minerals, medicines or flavorings.

4. The device of claim 1, wherein the one or more ribs are configured to substantially sealingly engage an interior portion of an outlet of one or more fluid containers.

5. The device of claim 1, wherein the one or more ribs is a plurality of ribs, and wherein the plurality of ribs have different outer diameters.

6. The device of claim 5, wherein the plurality of ribs is arranged such that the outer diameter of each rib decreases along the length of the filter casing.

7. A universal filter device comprising:
   a filter casing having an elongated body with an at least partially open first end and a closed second end, the filter casing being hollow and having an inner chamber, a plurality of openings being provided in the filter casing to permit fluid communication between the inner chamber and outside the body, the filter casing having an inner peripheral surface and an outer peripheral surface;
   a filter received in the inner chamber of the filter casing;
   a cover adapted to fit over at least a portion of an outlet of a fluid container, the first end of the filter casing being operatively connected to the cover;
   one or more container-engaging elements operatively connected to the cover, the one or more container-engaging elements being configured to substantially sealingly engage a portion of a plurality of fluid containers, whereby the passage of water or other fluid can be prevented; and
   an adapter separate from the filter casing, the adapter having a tubular adapter body with an inner peripheral surface and an outer peripheral surface, the adapter body being positioned on the filter casing such that the inner peripheral surface of the adapter body is operatively connected to the outer peripheral surface of the filter casing by at least frictional engagement at a location proximate to the at least partially open first end of the filter casing body, the adapter including one or more ribs, the one or more ribs being unitary with the adapter body and extending completely around the outer peripheral surface of the adapter body, the one or more ribs being configured to substantially sealingly engage a portion of a plurality of fluid containers.

8. The device of claim 7, wherein the filter includes at least one of activated carbon or activated coconut carbon.

9. The device of claim 7, further including a treatment element within the filter casing, wherein the treatment element is one or more vitamins, minerals, medicines or flavorings.

10. The device of claim 7, wherein the one or more container-engaging elements substantially sealingly engage an inner surface of the cover.

11. The device of claim 7, wherein the one or more container-engaging elements being configured to substantially sealingly engage an exterior portion of one or more fluid containers.

12. The device of claim 7, wherein the one or more container-engaging element comprises a flexible washer.

13. A universal filter system for fluid containers comprising:
a fluid container having an interior and an exterior, the fluid container having a fluid outlet opening; and
a universal filter system removably and substantially sealingly attached to the fluid container, the universal filter system including:
a filter casing having an elongated body with an at least partially open first end and a closed second end, the filter casing being hollow and having an inner chamber, a plurality of openings is provided in the body to permit fluid communication between the inner chamber and outside the body, the filter casing having an inner peripheral surface and an outer peripheral surface;
a filter received in the inner chamber of the filter casing;
a cover adapted to enclose at least a portion of the fluid outlet opening of the fluid container, the first end of the filter casing being operatively connected to the cover; and
an adapter separate from the filter casing, the adapter having a tubular adapter body with an inner peripheral surface and an outer peripheral surface, the adapter body being positioned on the filter casing such that the inner peripheral surface of the adapter body is operatively connected to the outer peripheral surface of the filter casing by at least frictional engagement at a location proximate to the at least partially open first end of the filter casing body, the adapter including one or more ribs, the one or more ribs being unitary with the adapter body and extending completely around the outer peripheral surface of the adapter body, the one or more ribs being configured to substantially sealingly engage a portion of a plurality of fluid containers.

14. The system of claim 13, wherein the one or more ribs are configured to substantially sealingly engage an interior portion of the fluid outlet opening of the fluid container.

15. The system of claim 14, wherein the one or more ribs comprise a plurality of ribs, wherein the plurality of ribs have different outer diameters.

16. The system of claim 13, one or more container-engaging elements operatively connected to the cover, the one or more container-engaging elements being configured to substantially sealingly engage a portion of a plurality of fluid containers, wherein the one or more container-engaging elements comprise a flexible washer.

* * * * *